May 30, 1961
J. H. MILLER
2,986,701
NETWORK FOR EXPANDED SCALE A.-C. INSTRUMENT
Filed Aug. 20, 1959
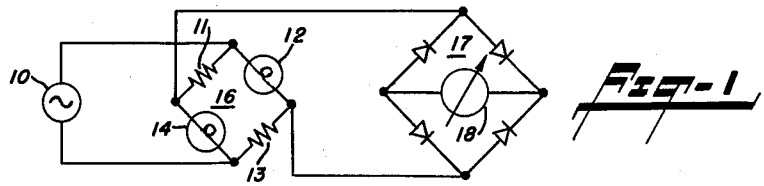
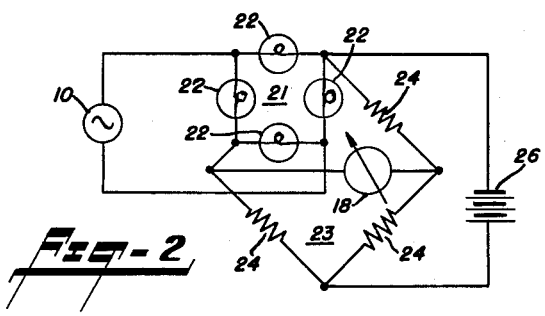
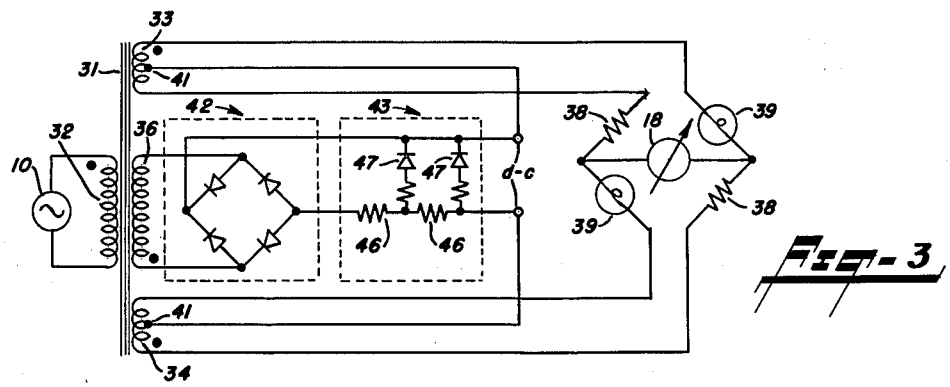
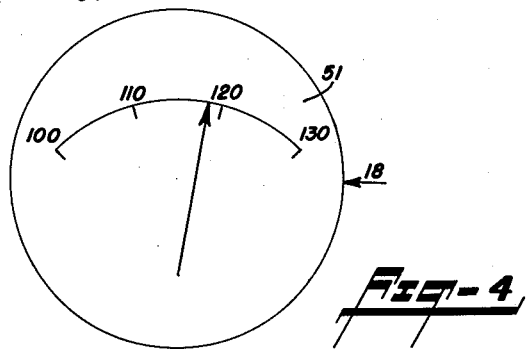
JOHN H. MILLER
INVENTOR.
BY
Rudolph J. Jurick
ATTORNEY United States Patent Office 2,986,701
Patented May 30, 1961

2,986,701

NETWORK FOR EXPANDED SCALE
A.-C. INSTRUMENT

John H. Miller, Harbor Bluffs, Largo, Fla., assignor to Daystrom, Incorporated, Murray Hill, N.J., a corporation of New Jersey Filed Aug. 20, 1959, Ser. No. 835,023

6 Claims. (Cl. 324—131)

This invention relates to an electrical network and more particularly to an expanded scale A.-C. instrument network for use in greatly expanding an A.-C. instrument scale over a desired range.

There are numerous applications wherein it is desirable to obtain an accurate measurement of a relatively small range of A.-C. voltages removed from zero and with the network contemplated by this invention, an electrical instrument may be made to accurately indicate the root-mean-square value of the A.-C. voltage source being measured over an expanded scale range.

An object of this invention is the provision of an electrical circuit network for use in conjunction with an electrical instrument whereby the instrument accurately indicates the magnitude of an A.-C. voltage over an expanded scale range.

An object of this invention is the provision of an expanded scale instrument network which is responsive to the true R.M.S. of an A.-C. source under measurement.

These and other objects and advantages of the invention will become apparent from the following description when taken with the accompanying drawings. It will be understood, however, that the drawings are for purposes of illustration and are not to be construed as defining the scope or limits of the invention, reference being had for the latter purpose to the appended claims.

In the drawings wherein like reference characters denote like parts in the several views:

Figures 1 and 2 are schematic diagrams of prior art A.-C. bridge networks shown to facilitate an understanding of my invention;

Figure 3 is a schematic circuit diagram of my novel expanded scale alternating current instrument network; and Figure 4 is a front view of an electrical instrument of the type used in conjunction with the network shown in Figure 3, which instrument includes an expanded scale.

In order to facilitate an understanding of the novel network of my invention, the two prior art bridge networks shown in Figures 1 and 2 will be described. Referring, first, to Figure 1, an alternating current source, designated by the reference numeral 10, is shown connected to a bridge network comprising a plurality of resistance elements 11, 12, 13 and 14 connected together in a series circuit to form a Wheatstone bridge circuit 16. The two resistance elements 11 and 13 in diametrically opposite balancing arms of the bridge are of the type displaying a constant resistance, while the resistance of the elements 12 and 14 changes in accordance with the amount of current therethrough. For example, the resistance elements 12 and 14 may comprise electric lamps, the resistance of which lamps changes as the lamps change temperature with the passage of current therethrough.

The alternating current source 10 which is to be measured is connected as one conjugate arm of the bridge between one pair of diagonally opposite bridge terminals. The other pair of bridge terminals are connected through a rectifier bridge network 17 to a D.-C. instrument 18. The Wheatstone bridge 16 is arranged to be balanced at that point where the start of the A.-C. scale of the meter 18 is desired; the lamps 12 and 14 operating at a dull red heat at such balance point. As the A.-C. voltage source 10 becomes greater than this balancing point, the bridge becomes unbalanced and A.-C. energy is transferred to the rectifier bridge 17, rectified, and applied to the direct current instrument 18 which will then deflect up-scale. The network is so adjusted that at the desired value of the A.-C. source 10 for full scale, sufficient D.-C. output is obtained from the rectifier bridge and is applied to the instrument to provide full scale deflection of the instrument.

Disadvantages of the use of the circuit of Figure 1 include the fact that the bridge 16 will also unbalance at an applied A.-C. voltage lower than the balancing voltage, and the meter will therefore deflect upscale at such lower values. This, obviously, is most undesirable. In some prior art arrangements, deflection of the instrument at lower voltages than the balancing voltage is eliminated by use of a ring modulator therein. Such arrangements, however, suffer to some degree from harmonic error and are therefore only true root-mean-square responsive to a limited degree. A true R.M.S. responsive prior art arrangement is shown in Figure 2 of the drawings wherein the A.-C. source 10 to be measured is connected betwen diagonally opposite terminals of a Wheatstone bridge 21 comprising a plurality of lamps 22 in the balancing arms thereof. The said lamp bridge 21 comprises one arm of a Wheatstone bridge 23 which includes resistance elements 24 in the other balancing arms thereof. A D.-C. supply source, such as a battery 26, is connected between one pair of diagonally opposite terminals of the bridge 23 while the D.-C. instrument 18 is connected across the other diagonally oposite terminals of the bridge 23. As in the circuit of Figure 1, the bridge 23 is unbalanced also below the point desired for the start of the scale. The meter 18, however, deflects below zero at the lower voltage values and crosses the scale at the desired value. With this arrangement, no ambiguity of instrument indications results since a different instrument indication is obtained for different A.-C. inputs thereto from the source 10.

The network of my invention, shown in Figure 3, comprises, generally, a novel composite of the prior art networks shown in Figures 1 and 2. Referring, then, to Figure 3, the network of my invention comprises a transformer 31 having a primary winding 32, to which the source of A.-C. 10 to be measured is connected, and three secondary windings 33, 34 and 36. The windings 33 and 34 are center-tapped and are substantially identical. The center-tapped transformer secondary windings are included in a bridge arrangement which may include, also, a pair of substantially identical constant resistance elements 38, 38 and a pair of current-dependent resistance elements 39, 39 comprising, for example, small electric lamps. The resistance elements 38, 38, lamps 39, 39 and transformer secondary windings 33, 34 are connected in sequence in a closed direct-current circuit. The D.-C. instrument 18 is connected between the junctions between the constant and current-dependent resistance elements 38 and 39.

The center taps, designated 41, 41, of the windings 33, 34, are connected to any suitable source of D.-C. potential, which source may comprise, for example, a battery, or the like. In Figure 3, the D.-C. source of potential for connection to the center taps on the windings 33, is shown derived from the A.-C. source 10 to be measured. The transformer secondary winding 36 is connected to a bridge rectifier 42, the D.-C. output of which is connected through a voltage regulator 43 to the transformer center-taps 41, 41. The regulator 43 may be of conventional design comprising, for example, series connected resistors 46, 46 and shunt-connected diodes 47, 47 of the Zener type. It will be understod that the direct current voltage at the points marked "D.-C." in Figure 3 is required to be constant for only those values of A.-C. voltage to be indicated on the instrument 18 between the left and right hand ends of the scale, and that a constant D.-C. voltage thereat for lower A.-C. voltage inputs than those shown on the instrument is unnecessary. Thus, a regulator which includes the Zener diodes connected in opposition to the normal current flow is entirely satisfactory. In accordance with my invention, the D.-C. voltage to the center-taps of the transformer secondary windings 33, 34 may be derived from any desired source.

A study of the network reveals that the terminals to which the instrument 18 is connected are balanced with respect to the alternating current since the same A.-C. voltage is generated in the two center-tapped windings 33 and 34. Thus, no alternating current from these windings will flow into the instrument 18. It will be apparent, however, that direct current from the regulator will appear at the instrument 18 in terms of the degree of unbalance of the closed network considered as a D.-C. system, said unbalance being caused by heating of the lamps 39, 39 by the circulating alternating current.

Reference is made, also, to Figure 4 of the drawings wherein a typical instrument scale plate 51 is shown for the instrument 18. The expanded scale therein illustrated starts at 100 volts and has a full scale value of 130 volts. The closed bridge network is balanced to the D.-C. applied to the center taps of the windings 33, 34 at an A.-C. voltage applied to the transformer primary winding 32 corresponding to the left hand scale value of the instrument, which, for the instrument illustrated in Figure 5, is 100 volts A.-C. As increasing voltages are applied, the bridge will become unbalanced due to the heat of the lamps 39, 39 and the regulated D.-C. will then be impressed upon the meter terminals to a degree determined completely by the R.M.S. value of the alternating current source above the balance point of the network.

Having now described my invention in detail in accordance with the requirements of the patent statutes, various changes and modifications will suggest themselves to those skilled in this art. For example, it will be apparent that a functional circuit results in the use of only one current-dependent resistance element 39 in the network and three fixed resistors in place of the pair of fixed resistance elements 38, 38 and the pair of current-dependent resistance elements 39, 39 shown in Figure 3. Such an arrangement will not actually balance in the composite bridge, and it will provide only one-half the change in bridge current, other things being equal, but it is a workable and feasible arrangement. It is intended that this and other such changes and modifications shall fall within the spirit and scope of the invention as recited in the following claims.

I claim:

1. An expanded scale instrument network for an expanded scale electrical instrument for the measurement of the R.M.S. voltage value of an alternating current source comprising; first, second, third and fourth resistance elements at least one of which is current-dependent such that the change in resistance thereof is proportional to the square of the current therethrough; a pair of center-tapped transformer secondary windings; means connecting the said resistance elements and center-tapped windings, in a closed circuit in a sequence comprising the first and second resistance elements, one center-tapped winding, the third and fourth resistance elements and the other center-tapped winding; a source of D.-C. potential connected between the center taps of the said windings; the expanded scale electrical instrument being adapted to be connected between the junctions between the interconnected resistance elements; the alternating current source to be measured being inductively coupled to the said center-tapped transformer secondary windings.

2. An expanded scale instrument network for an expanded scale electrical instrument for the measurement of the R.M.S. value of an alternating current source comprising; a pair of constant resistance elements; a pair of current-dependent resistance elements; a pair of center-tapped transformer secondary windings; means connecting the said constant resistance elements, current-dependent resistance elements, and center-tapped windings in sequence in a closed circuit; a source of D.-C. potential connected between the center taps of the said windings; the expanded scale electrical instrument being adapted to be connected between the junctions between the constant and current-dependent resistance elements; the alternating current source to be measured being inductively coupled to the said center-tapped transformer secondary windings.

3. The invention as recited in claim 2 wherein the current-dependent resistance elements comprise electric lamps.

4. The invention as recited in claim 2 wherein the said source of D.-C. potential comprises a third transformer secondary winding inductively coupled to said alternating current source, and a rectifier network connected to the third secondary winding.

5. The invention as recited in claim 2 wherein the said source of D.-C. potential comprises a third transformer secondary winding inductively coupled to said alternating current source, a rectifier network connected to the third secondary winding, and a regulator network connected to the said rectifier network output.

6. The invention as recited in claim 5 wherein the said regulator network includes a shunt-connected Zener diode therein.

References Cited in the file of this patent

UNITED STATES PATENTS

| | | |
|---|---|---|
| 2,586,804 | Fluke | Feb. 26, 1952 |
| 2,762,976 | Conant | Sept. 11, 1956 |
| 2,873,428 | Bruno | Feb. 10, 1959 |